(12) United States Patent
Menjak et al.

(10) Patent No.: US 8,033,574 B2
(45) Date of Patent: Oct. 11, 2011

(54) COLLAPSIBLE STEERING COLUMN ASSEMBLY

(75) Inventors: Damir Menjak, Frankenmuth, MI (US); Ratko Menjak, Frankenmuth, MI (US)

(73) Assignee: Nexteer (Beijing) Technology Co., Ltd.

( * ) Notice: Subject to any disclaimer, the term of this patent is extended or adjusted under 35 U.S.C. 154(b) by 500 days.

(21) Appl. No.: 11/906,428

(22) Filed: Oct. 2, 2007

(65) Prior Publication Data

US 2008/0111363 A1   May 15, 2008

Related U.S. Application Data

(60) Provisional application No. 60/865,856, filed on Nov. 15, 2006.

(51) Int. Cl.
*B62D 1/18* (2006.01)
(52) U.S. Cl. .......................... 280/777; 74/492
(58) Field of Classification Search .................. 280/777, 280/775; 74/492, 493, 495, 496
See application file for complete search history.

(56) References Cited

U.S. PATENT DOCUMENTS

| | | | | |
|---|---|---|---|---|
| 5,562,307 A | * | 10/1996 | Connor | 280/777 |
| 5,669,634 A | * | 9/1997 | Heinzman et al. | 280/777 |
| 5,706,704 A | * | 1/1998 | Riefe et al. | 74/493 |
| 5,720,496 A | * | 2/1998 | Riefe et al. | 280/775 |
| 5,820,163 A | * | 10/1998 | Thacker et al. | 280/775 |
| 6,450,532 B1 | * | 9/2002 | Ryne et al. | 280/777 |
| 6,578,872 B2 | * | 6/2003 | Duval et al. | 280/777 |
| 6,652,002 B2 | * | 11/2003 | Li et al. | 280/777 |
| 6,749,222 B2 | * | 6/2004 | Manwaring et al. | 280/777 |
| 6,764,098 B2 | * | 7/2004 | Matsumoto et al. | 280/777 |
| 6,802,536 B2 | * | 10/2004 | Li et al. | 280/777 |
| 6,877,775 B2 | * | 4/2005 | Manwaring et al. | 280/777 |
| 7,118,131 B2 | * | 10/2006 | Manwaring et al. | 280/777 |
| 7,325,834 B2 | * | 2/2008 | Manwaring et al. | 280/777 |
| 7,510,213 B2 | * | 3/2009 | Manwaring et al. | 280/777 |
| 2006/0214411 A1 | | 9/2006 | Ikegaya et al. | |
| 2008/0084055 A1 | * | 4/2008 | Cymbal et al. | 280/777 |

* cited by examiner

*Primary Examiner* — Paul N Dickson
*Assistant Examiner* — Timothy Wilhelm
(74) *Attorney, Agent, or Firm* — Cantor Colburn LLP

(57) ABSTRACT

A collapsible steering column assembly having a variable energy absorption curve is disclosed. The assembly includes a column jacket and an energy absorption device defining a deformation channel. A strap, interconnecting the column jacket and the energy absorption device, is disposed within the channel and moves along a deformation path in response to collapse of the column jacket. A pin is moveable into the deformation channel by a pyrotechnic device to alter the deformation path. Accordingly, the energy absorption device absorbs energy at a first rate when the pin is not disposed in the deformation channel, and absorbs energy at a second higher rate when the pin is disposed in the deformation channel.

17 Claims, 4 Drawing Sheets

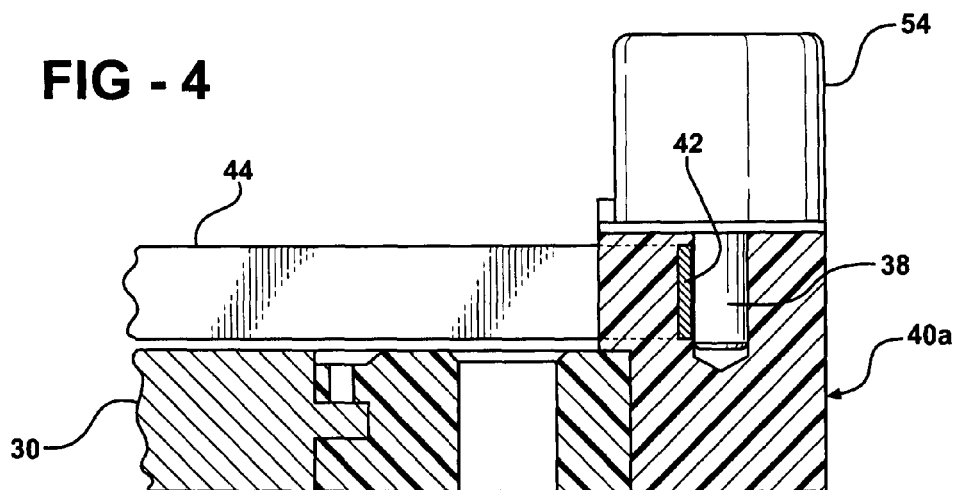
FIG - 4
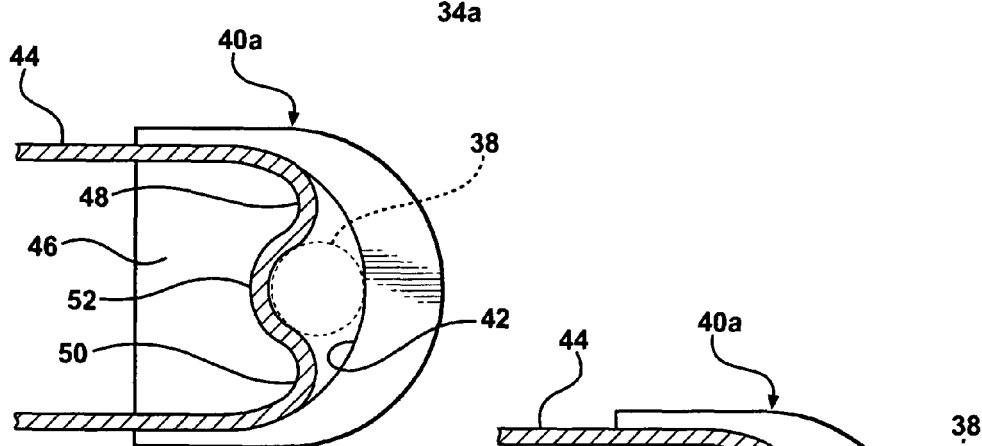
FIG - 5
FIG - 6
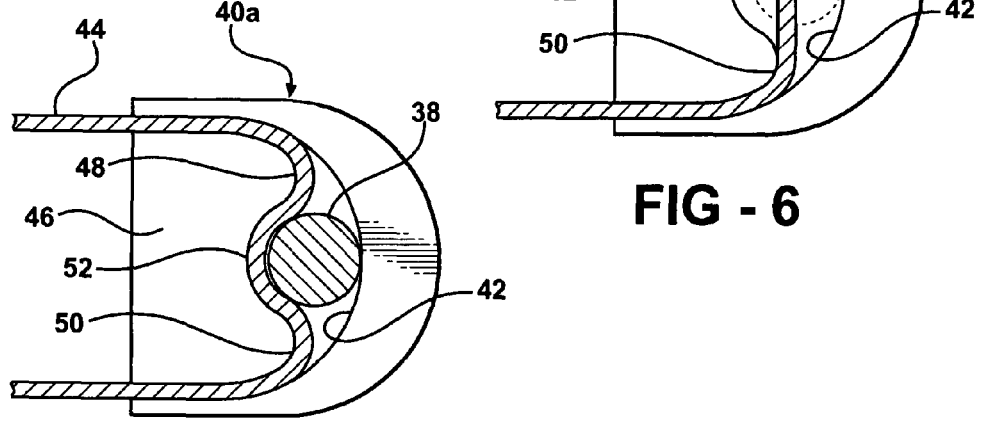
FIG - 7

COLLAPSIBLE STEERING COLUMN ASSEMBLY

CROSS REFERENCE TO RELATED APPLICATION

This application claims the benefit of U.S. provisional patent application Ser. No. 60/865,856 filed on Nov. 15, 2006, the disclosure of which is hereby incorporated by reference.

BACKGROUND OF THE INVENTION

1. Field of the Invention

This application relates generally to steering columns, and more specifically, to adaptive energy absorbing devices for collapsible steering columns.

2. Description of the Related Art

Automotive steering columns are typically equipped with kinetic energy absorption devices. The energy absorption devices reduce injury to a vehicle operator caused by the operator impacting a steering wheel as a result of a collision event. Such impacts during vehicle collision typically cause the steering column to collapse. The energy absorption devices absorb the energy transmitted through the steering column as the steering column collapses.

Such energy absorbing steering columns generally include a housing that translates linearly through a collapse stroke during the collision event. A force generated by the driver impacting the steering wheel initiates the collapse stroke. The steering wheel housing moves against a resisting or reactive force that may be produced by an energy absorption device designed to convert a portion of the driver's kinetic energy into work. The resisting force may be generated by systems including a plastically deformable metal element that is a part of the energy absorbing device. Such energy absorbing devices have fixed energy absorption capabilities, and offer no control over their performance during the collapse stroke. More specifically, traditional energy absorbing devices have a fixed energy absorbing curve which is optimized to protect a given and limited group of drivers. In most cases the group represents an average size male driver.

In order to provide a variable energy absorption curve, pyrotechnic devices have been incorporated into the collapsible steering column assembly to selectively engage any number of a plurality of energy absorption devices disposed on the steering column assembly. Such a steering column assembly is disclosed in U.S. Pat. No. 6,578,872 to Duval et al. Steering column assemblies including the pyrotechnic devices allow the energy absorption curve to be customized to match attributes of the driver, and the severity of the collision event. However, variability of the energy absorption curve is based on engaging zero, one, two, etc energy absorption devices disposed on the steering column assembly. The amount of energy absorbed by each individual energy absorption device does not vary.

SUMMARY OF THE INVENTION AND ADVANTAGES

The subject invention provides a collapsible steering column assembly for a vehicle. The steering column assembly comprises a column jacket. The column jacket is moveable along a longitudinal axis in response to a collision event. A release module is releasably coupled to the column jacket. The release module couples the column jacket to the vehicle prior to the collision event and releases the column jacket from the vehicle in response to movement of the column jacket along the longitudinal axis. An energy absorption device is coupled to one of the column jacket and the release module. The energy absorption device defines a deformation channel, and includes a strap. The strap is disposed within the deformation channel, with the strap moveable through the deformation channel along a deformation path in response to movement of the column jacket along the longitudinal axis. A pin is moveable into the deformation channel to alter the deformation path of the strap through the deformation channel. Altering the deformation path increases a resistance force resisting movement of the strap through the deformation channel, thereby increasing an amount of energy absorbed.

Accordingly, the subject invention provides a collapsible steering column assembly that provides a variable energy absorbing curve from a single energy absorbing device by modifying the deformation path of the strap to increase resistance.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a fragmentary cross sectional view of steering column assembly taken along cut-line 4-4 of FIG. 2;

FIG. 5 is a top view of the energy absorption device prior to collapse of the steering column assembly;

FIG. 6 is a top view of the energy absorption device after collapse of the steering column assembly;

FIG. 7 is a top view of the energy absorption device after collapse of the steering column assembly with a in altering a deformation path of a strap;

DETAILED DESCRIPTION OF THE INVENTION

Referring to the Figures, wherein like numerals indicate corresponding parts throughout the several views, a collapsible steering column assembly is shown generally at 20. The steering column assembly 20 is incorporated into a vehicle as is well known in the art.

Figure 1:
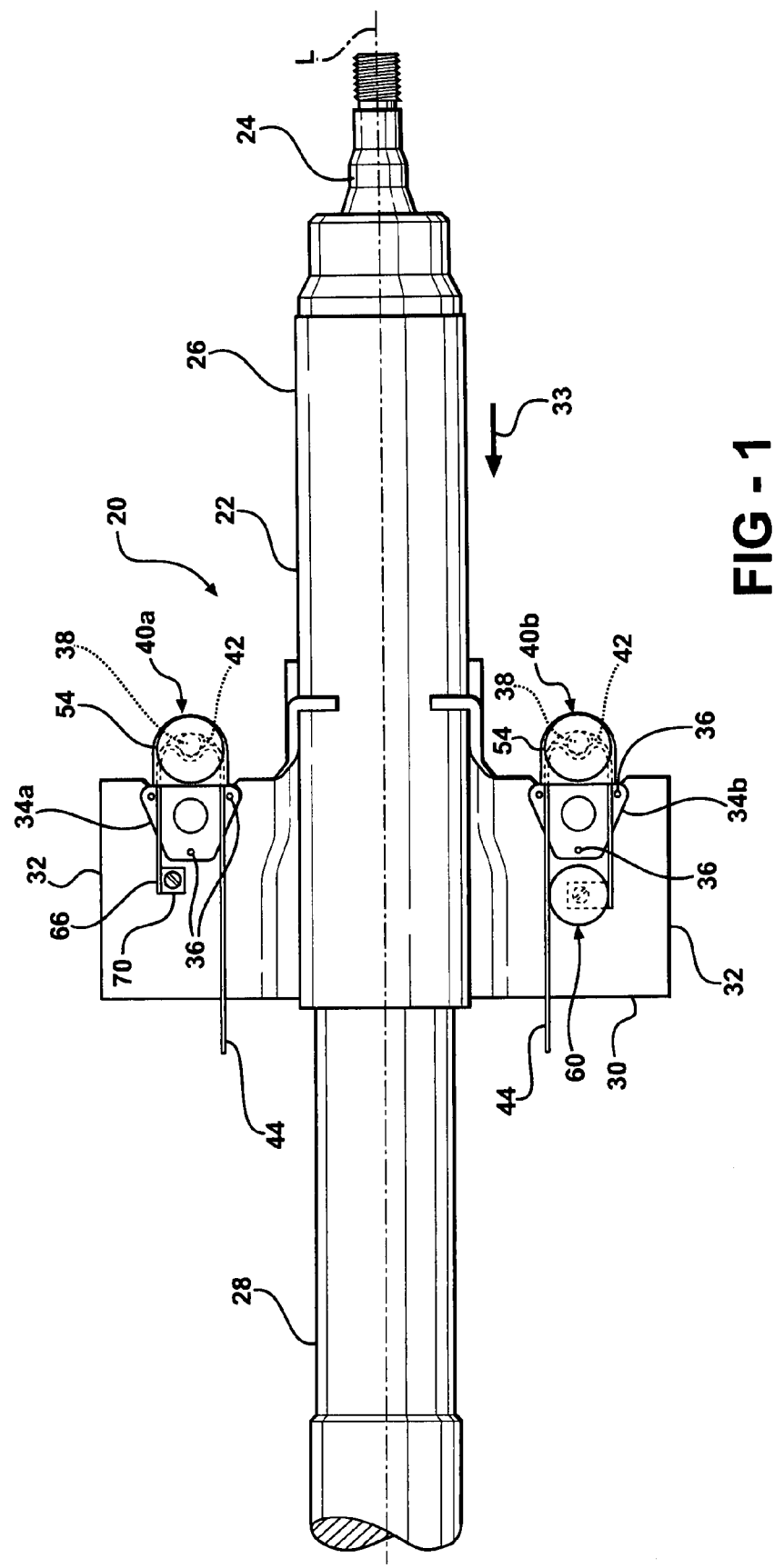
FIG. 1 is a top view of a collapsible steering column assembly of the present invention.

Referring to FIG. 1, a steering column assembly 20 exemplifying the present invention includes a column jacket 22. A steering shaft 24 is rotatably disposed within the column jacket 22. A steering wheel (not shown) is connected to the steering shaft 24 as is well known in the art. The column jacket 22 and the steering shaft 24 extend longitudinally along a longitudinal axis L. The steering shaft 24 is located radially inward from and generally concentric with the column jacket 22. The column jacket 22 has a radially outward or upper jacket 26, and a radially inward or lower jacket 28.

A bracket 30 is attached to the column jacket 22. The bracket 30 preferably includes a pair of extensions 32 extending out from opposing sides of the column jacket 22. The column jacket 22 and the bracket 30 are moveable along the longitudinal axis L in response to a collision event in a direction indicated by arrow 33. It should be appreciated that the collision event is typically a vehicular crash, in which an operator of the vehicle transmits a force to the steering wheel and thereby to the steering column assembly 20. In response to the force transmitted through the steering column assembly 20, the column jacket 22 collapses, i.e., moves forward toward the front of the vehicle, to reduce the likelihood or severity of injury to the operator. However, it should be understood that the collision event may include some other type of event other than the vehicular crash.

Figure 2:
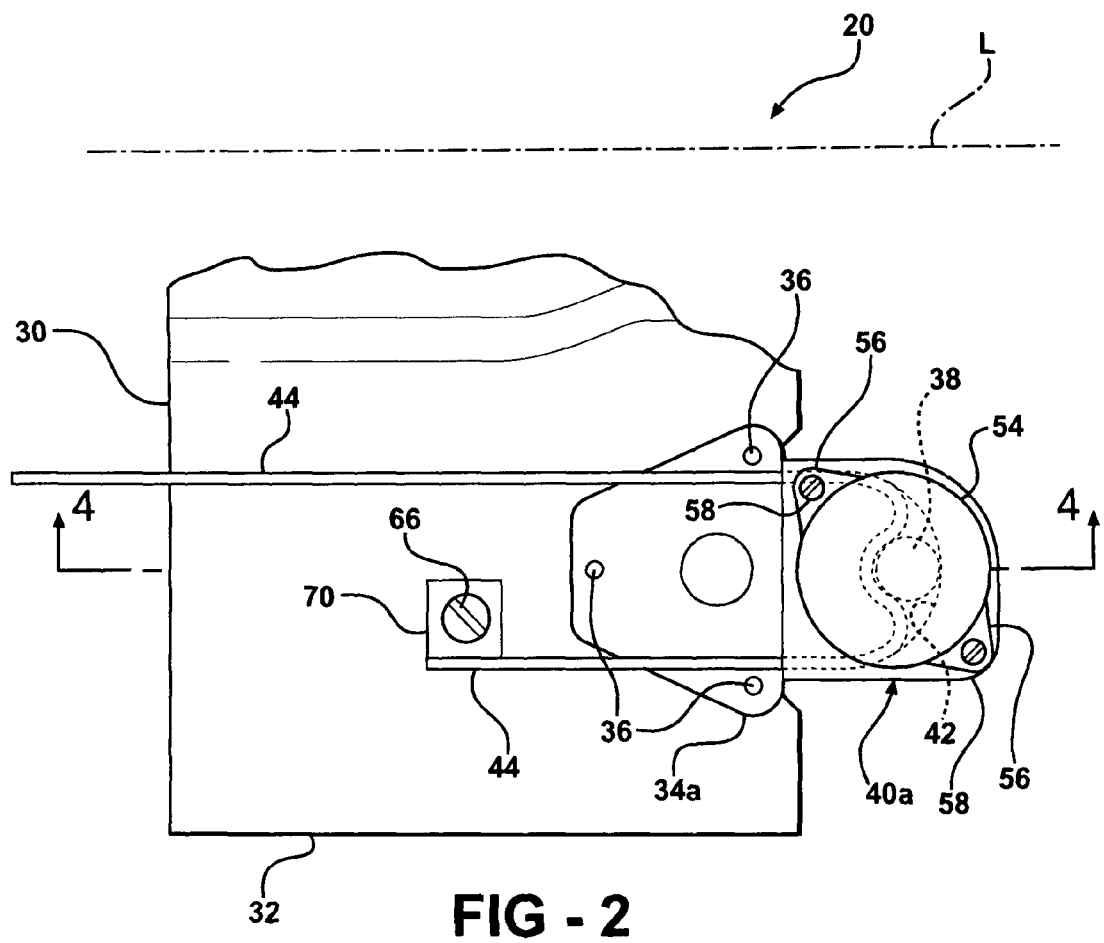
FIG. 2 is an enlarged partial top view of the steering column assembly illustrating a first energy absorption device coupled to a first release module.

Referring also to FIGS. 2 and 4, a release module 34 is releasably coupled to the column jacket 22. The release module 34 couples the column jacket 22 to the vehicle prior to the collision event, and releases the column jacket 22 form the vehicle in response to movement of the column jacket 22 along the longitudinal axis L. Preferably, the release module 34 is coupled to the bracket 30, with the bracket 30 interconnects the column jacket 22 and the release module 34 prior to the collision event. The release module 34 is fixedly attached to the vehicle, and stays connected to the vehicle after the bracket 30 and the column jacket 22 are released from the release module 34. Typically, the release module 34 is coupled to the bracket 30 by a plurality of sheer pins 36. The shear pins 38 are fractured when the column jacket 22 collapses forward along the longitudinal axis L, thereby disconnecting the bracket 30 and the column jacket 22 from the release module 34. However, it should be appreciated that the release module 34 may be coupled to the bracket 30 or the column jacket 22 in some other suitable fashion.

An energy absorption device 40 is coupled to one of the column jacket 22 and the release module 34. It should be appreciated that since the bracket 30 interconnects the release module 34 and the column jacket 22, the energy absorption device 40 may also be coupled to the bracket 30. Therefore, throughout this detailed description, it should be understood that elements described as being coupled to, connected to or attached to the column jacket 22 should be interpreted as being coupled to, connected to or attached to either the column jacket 22 or the bracket 30. Likewise, elements described as being coupled to, connected to, or attached to the bracket 30 should be interpreted as being coupled to, connected to or attached to the bracket 30 or the column jacket 22.

Figure 9:
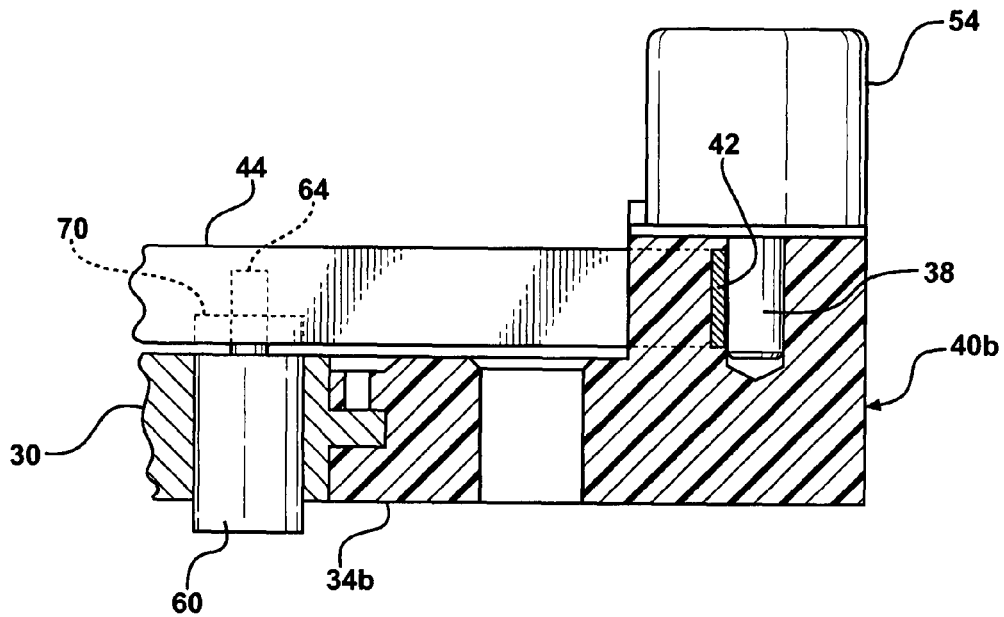
FIG. 9 is a cross sectional view of the steering column assembly taken along cut-line 9-9 of FIG. 8.

As best shown in FIGS. 5 through 7, the energy absorption device 40 defines a deformation channel 42, and includes a strap 44 disposed within the deformation channel 42. The strap 44 is moveable through the deformation channel 42 along a deformation path in response to movement of the column jacket 22 along the longitudinal axis L. As shown in FIG. 4, the energy absorption device 40 may be a separate piece fixedly attached to one of the column jacket 22 or the release module 34. Alternatively, the energy absorption device 40 may be integrally formed with one of the column jacket 22 or the release module 34. As shown in FIG. 9, the energy absorption device 40 is integrally formed with the release module 34.

The strap 44 includes a plastically deformable material, such as steel. The width of the strap 44 may vary along the length of the strap 44 so that the energy absorption curve may be tuned as desired.

Referring to FIGS. 5 through 7, the energy absorption device 40 includes an anvil 46, which defines the deformation channel 42. The anvil 46 includes a first lobe 48 and a second lobe 50, with a depression 52 disposed between the first lobe 48 and the second lobe 50. The strap 44 is pre-bent to be disposed against the first lobe 48, the depression 52, and the second lobe 50 prior to longitudinal movement of the column jacket 22.

The deformation channel 42 is defined by the anvil 46 of the energy absorption device 40, and includes a generally arcuate shape that widens at the apex of the arc. It should be appreciated, however, that the deformation channel 42 may include any shape that forces the strap 44 to bend or otherwise be deformed as the strap 44 is drawn along the deformation path through the deformation channel 42. Preferably, the energy absorption device 40, and accordingly the deformation channel 42 are disposed on the release module 34.

The deformation path is the course the strap 44 follows through the deformation channel 42. It should be appreciated that the more complex the deformation path, i.e., the more twists, turns and bends that the strap 44 must move through, increases the force required to draw the strap 44 along the deformation path through the deformation channel 42. The increase in force required to draw the strap 44 along the deformation path correlates to an increase in the resistance force and the amount of energy absorbed by the energy absorption device 40.

A pin 38 is moveable into the widened apex area of the deformation channel 42 to alter the deformation path of the strap 44 through the deformation channel 42. As described above, alteration of the deformation path, i.e., increasing the number of bends the strap 44 must be drawn through, increases a resistance force resisting movement of the strap 44 through the deformation channel 42. It should be appreciated that when the pin 38 is not engaged in the deformation channel 42, the strap 44 makes a single 180° bend, defining a radius X. When the pin 38 is disposed within the deformation channel 42, the pin 38 forces the strap 44 into a sinusoidal deformation path through the widened apex area of the deformation channel 42. The sinusoidal deformation path forces the strap 44 to make three bends, each having a radius Y smaller than the radius X. Accordingly, the deformation path defined when the pin 38 is disposed within the deformation channel 42 provides a higher resistance force. Therefore, the single energy absorption device 40 of the subject invention defines a two stage variable energy absorption curve; a first stage with the pin 38 not in the deformation channel 42 and a second stage with the pin 38 in the deformation channel 42.

As best shown in FIGS. 4 and 9, the steering column assembly 20 further includes an actuator 54 for selectively moving the pin 38 into the deformation channel 42. The actuator 54 is responsive to a signal received from a controller (not shown). Preferably, the actuator 54 includes a pyrotechnic device, and is fixedly connected to the release module 34. However, it should be appreciated that the actuator 54 may include some other device capable of quickly moving the pin 38 into the deformation channel 42. The controller receives data from various sensors on the vehicle, and then determines the appropriate setting for the energy absorption device 40.

Accordingly, referring to FIG. 5, prior to the collision event, the pin 38 is not disposed within the deformation channel 42, and the strap 44 is disposed against the first lobe 48, the depression 52 and the second lobe 50 of the anvil 46. In response to the longitudinal movement of the column jacket 22, the controller will either calculate to signal the actuator 54 to move the pin 38 into the deformation channel 42, or will calculate not to move the pin 38 into the deformation channel 42. If the controller signals the actuator 54 to move the pin 38 into the deformation channel 42, then the actuator 54 moves the pin 38 into the deformation channel 42 prior to the strap 44 moving along the deformation path as shown in FIG. 7. Once the pin 38 is in the deformation channel 42, the strap 44 bears against the first lobe 48, the second lobe 50 and the pin 38 as the strap 44 moves along the deformation path. If the controller does not signal the actuator 54 to move the pin 38 into the deformation channel 42, then the strap 44 moves along the deformation path without the pin 38 interfering, as shown in FIG. 6. Accordingly, the strap 44 will be drawn out of the depression 52 between the first and second lobes 48, 50 defined by the anvil 46, and will only bear against the first lobe 48 and the second lobe 50 as the strap 44 moves along the deformation path through the deformation channel 42.

As shown in the Figures, the actuator 54 is coupled to the release module 34. Referring to FIG. 2, the actuator 54 may be coupled to the release module 34 in any suitable manner. As shown, the actuator 54 includes a plurality of wings 56. The steering column assembly 20 further comprises a plurality of actuator fasteners 58 interconnecting the plurality of wings 56 to the release module 34. Alternatively, the actuator 54 may include a threaded bore, with the actuator fasteners 58 extending through the release module 34 into threaded engagement with the threaded bore.

Preferably, and as shown in FIG. 1, the release module 34 includes a first release module 34a and a second release module 34b. Also, the energy absorption device 40 includes a first energy absorption device 40a and a second energy absorption device 40b, with the first energy absorption device 40a being coupled to one of the first release module 34a and the column jacket 22 and the second energy absorption device 40b being coupled to one of the second release module 34b and the column jacket 22.

If the steering column assembly 20 includes the first energy absorption device 40a and the second energy absorption device 40b, as is shown in FIG. 1, then the controller calculates how many of the energy absorption devices 40a, 40b to engage, and which stage, i.e., the pin 38 in the deformation channel 42 or the pin 38 withdrawn from the deformation channel 42, each energy absorption device 40 should be employed at. The controller then signals the actuator 54, if so calculated, to move the pin 38 in each of the first energy absorption device 40 and the second energy absorption device 40.

Figure 8:
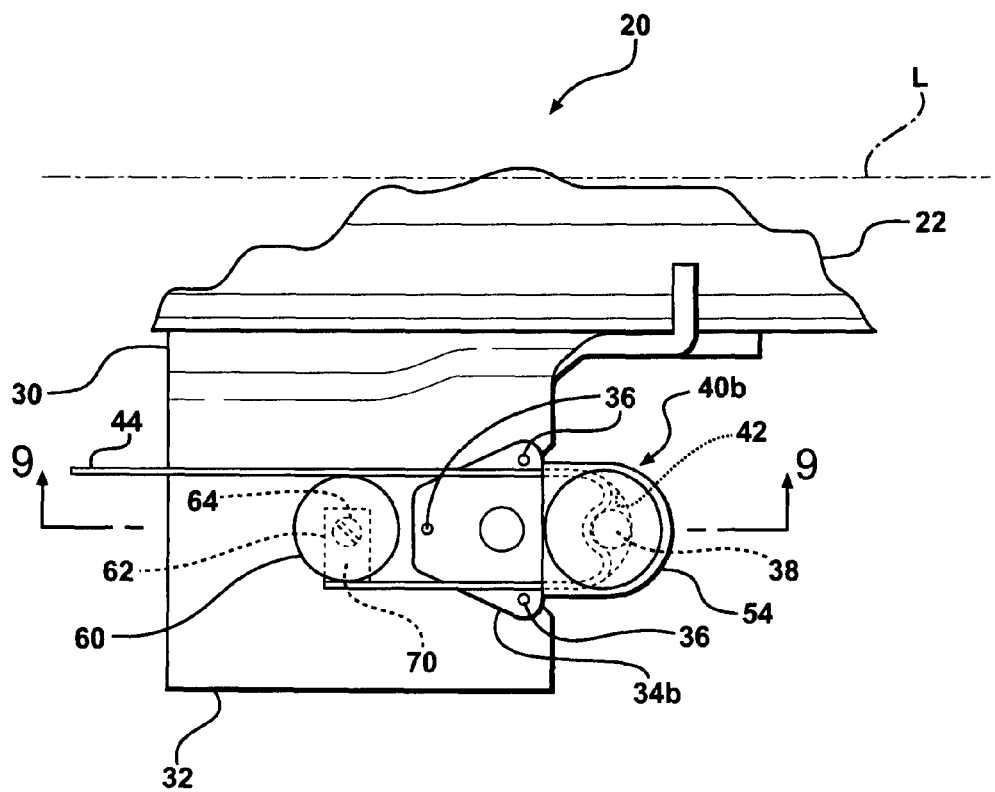
FIG. 8 is an enlarged partial top view of the steering column assembly illustrating a second energy absorption device coupled to a second release module.

Referring to FIGS. 8 and 9, the steering column assembly 20 may further comprise a connecting device 60 for selectively coupling the strap 44 to the column jacket 22 or the release module 34. It should be appreciated that if the steering column assembly 20 includes the first and second energy absorption devices 40a, 40b, then the connecting device 60 may couple one or both of the first energy absorption device 40a and the second energy absorption device 40b to one of the column jacket 22 and the release module 34.

The strap 44 defines an aperture 62 and the connecting device 60 includes a shaft 64 moveable into the aperture 62 to couple the strap 44 of one of the first energy absorption device 40 and the second energy absorption device 40 to one of the column jacket 22 and the release module 34. Preferably, the connecting device 60 includes a pyrotechnic device for selectively moving the shaft 64 into interlocking engagement with the aperture 62. However, it should be understood that the steering column assembly 20 may include some other device capable of moving the shaft 64 into interlocking engagement with the aperture 62.

The strap 44 of one of the first energy absorption device 40a and the second energy absorption device 40b is fixedly attached to one of the bracket 30 and the release module 34. As shown in FIG. 1, the first energy absorption device 40a is coupled to the first release module 34a and the strap 44 of the first energy absorption device 40a is fixedly attached to the bracket 30. The second energy absorption device 40b is coupled to the second release module 34b and the connecting device 60 selectively connects the strap 44 of the second energy absorption device 40b to the bracket 30.

It should be appreciated that the steering column assembly may include an energy absorption device that does not include a pyrotechnic device, such as previously utilized in the prior art, in any combination with the energy absorption devices 40a and 40b of the subject invention, to provide a steering column assembly with a multitude of possible energy absorption curves. For example, a steering column assembly having one prior art energy absorption device continuously active (i.e., no pyrotechnic device fixedly interconnecting the release module and the bracket) and one energy absorption device 40b, would provide an energy absorption curve having three stages; a first stage with only the prior art energy absorption device absorbing energy, a second stage with the prior art energy absorption device and the energy absorption device 40b absorbing energy in which the pin 38 is not engaged within the deformation channel 42, and a third stage with the prior art energy absorption device and the energy absorption device 40b absorbing energy in which the pin 38 is engaged within the deformation channel 42. Accordingly, one skilled in the art may appreciate that there may be any number of combinations of energy absorption devices to provide a wide array of differing energy absorption curves as required.

Figure 3:
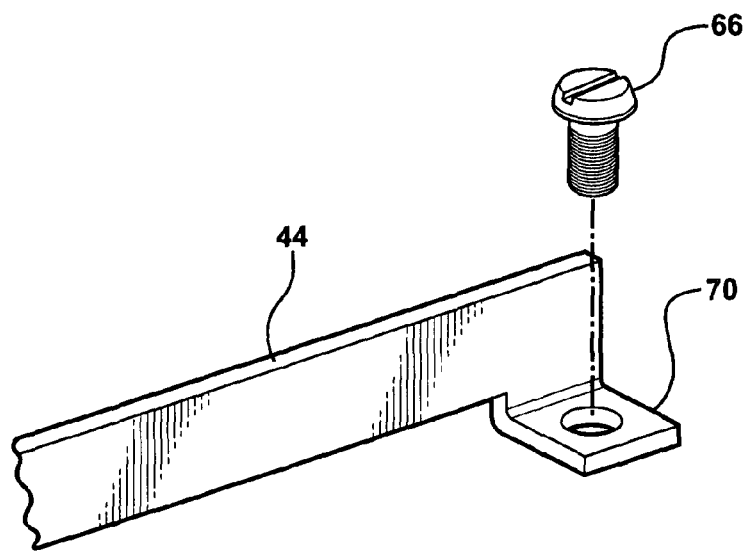
FIG. 3 is a perspective view of a secured end of a strap of the first energy absorption device.

Referring to FIG. 3, In order to attach the strap 44 to the bracket 30, the steering column assembly 20 further includes a fastener 66 fixedly interconnecting the strap 44 and the bracket 30. Preferably, the strap 44 may include a flange 70 extending parallel the bracket 30, with the flange 70 disposed against the bracket 30. The fastener 66 interconnects the flange 70 and the bracket 30. Alternatively, the bracket 30 includes a tab extending vertically relative to the bracket 30. The tab is disposed against the strap 44, with the fastener 66 interconnecting the tab and the strap 44.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A collapsible steering column assembly for a vehicle, said assembly comprising:
   a column jacket moveable along a longitudinal axis in response to a collision event;
   a release module releasably coupled to said column jacket for coupling said column jacket to the vehicle prior to the collision event and releasing said column jacket from the vehicle in response to movement of said column jacket along said longitudinal axis;
   an energy absorption device coupled to one of said column jacket and said release module and defining a deformation channel and including a strap disposed within said deformation channel with said strap moveable through said deformation channel along a deformation path in response to movement of said column jacket along said longitudinal axis;
   a pin moveable in an axial direction from an axial position where said pin is not in said deformation channel to another axial position where said pin is disposed in said deformation channel such that said pin contacts said strap to alter said deformation path of said strap through said deformation channel for increasing a resistance force resisting movement of said strap through said deformation channel to increase an amount of energy absorbed; and an actuator for selectively moving said pin in the axial direction;

wherein said energy absorption device includes an anvil defining said deformation channel; and wherein said anvil includes a first lobe and a second lobe and a depression disposed between said first lobe and said second lobe.

2. An assembly as set forth in claim 1 wherein said actuator includes a pyrotechnic device.

3. An assembly as set forth in claim 1 further comprising a plurality of actuator fasteners and wherein said actuator includes a plurality of wings with said plurality of actuator fasteners interconnecting said plurality of wings to said release module.

4. An assembly as set forth in claim 1 wherein said strap is disposed against said first lobe, said depression and said second lobe prior to said longitudinal movement of said column jacket.

5. An assembly as set forth in claim 1 wherein said energy absorption device is coupled to said release module and said actuator is fixedly connected to said energy absorption device.

6. An assembly as set forth in claim 5 wherein said strap is fixedly attached to said column jacket.

7. An assembly as set forth in claim 5 further comprising a connecting device for selectively coupling said strap to said column jacket.

8. An assembly as set forth in claim 1 wherein said release module includes a first release module and a second release module and said energy absorption device includes a first energy absorption device coupled to one of said first release module and said column jacket and further includes a second energy absorption device coupled to one of said second release module and said column jacket.

9. An assembly as set forth in claim 8 further including a connecting device for selectively interconnecting one of said first energy absorption device and said second energy absorption device to one of said column jacket and said release module.

10. An assembly as set forth in claim 9 wherein said strap defines an aperture and said connecting device includes a shaft moveable into said aperture to couple said strap of one of said first energy absorption device and said second energy absorption device to one of said column jacket and said release module.

11. An assembly as set forth in claim 9 wherein said first energy absorption device is coupled to said first release module and said strap of said first energy absorption device is fixedly attached to said column jacket.

12. An assembly as set forth in claim 11 wherein said second energy absorption device is coupled to said second release module and said connecting device selectively connects said strap of said second energy absorption device to said bracket.

13. An assembly as set forth in claim 1 further including a bracket attached to said column jacket and interconnecting said column jacket and said release module prior to the collision event.

14. A collapsible steering column assembly for a vehicle, said assembly comprising:

a column jacket moveable along a longitudinal axis in response to a collision event;

a release module releasably coupled to said column jacket for coupling said column jacket to the vehicle prior to the collision event and releasing said column jacket from the vehicle in response to movement of said column jacket along said longitudinal axis;

an energy absorption device coupled to one of said column jacket and said release module and defining a deformation channel and including a strap disposed within said deformation channel with said strap moveable through said deformation channel along a deformation path in response to movement of said column jacket along said longitudinal axis;

a pin moveable into said deformation channel to alter said deformation path of said strap through said deformation channel for increasing a resistance force resisting movement of said strap through said deformation channel to increase an amount of energy absorbed; and an actuator for selectively moving said pin into said deformation channel, wherein said energy absorption device is coupled to said release module and said actuator is fixedly connected to said energy absorption device, and said release module and said energy absorption device are integrally formed.

15. A collapsible steering column assembly for a vehicle, said assembly comprising:

a column jacket moveable along a longitudinal axis in response to a collision event;

a release module releasably coupled to said column jacket for coupling said column jacket to the vehicle prior to the collision event and releasing said column jacket from the vehicle in response to movement of said column jacket along said longitudinal axis;

an energy absorption device coupled to one of said column jacket and said release module and defining a deformation channel and including a strap disposed within said deformation channel with said strap moveable through said deformation channel along a deformation path in response to movement of said column jacket along said longitudinal axis;

a pin moveable in an axial direction from an axial position where said pin is not in said deformation channel to another axial position where said pin is disposed in said deformation channel such that said pin contacts said strap to alter said deformation path of said stray through said deformation channel for increasing a resistance force resisting movement of said strap through said deformation channel to increase an amount of energy absorbed; and an actuator for selectively moving said pin in the axial direction;

wherein said release module includes a first release module and a second release module and said energy absorption device includes a first energy absorption device coupled to one of said first release module and said column jacket and further includes a second energy absorption device coupled to one of said second release module and said column jacket;

further including a connecting device for selectively interconnecting one of said first energy absorption device and said second energy absorption device to one of said column jacket and said release module;

wherein said connecting device includes a pyrotechnic device for selectively moving said shaft into interlocking engagement with said aperture.

16. A collapsible steering column assembly for a vehicle, said assembly comprising:
- a column jacket moveable along a longitudinal axis in response to a collision event;
- a release module releasably coupled to said column jacket for coupling said column jacket to the vehicle prior to the collision event and releasing said column jacket from the vehicle in response to movement of said column jacket along said longitudinal axis;
- an energy absorption device directly coupled to said release module and defining a deformation channel and including a strap disposed within said deformation channel with said strap moveable through said deformation channel along a deformation path in response to movement of said column jacket along said longitudinal axis; and
- an axially extending pin moveable in an axial direction from a first axial position axially displaced outside of said deformation channel to a second axial position where said pin is disposed in said deformation channel such that said pin contacts said strap to alter said deformation path of said strap through said deformation channel for increasing a resistance force resisting movement of said strap through said deformation channel to increase an amount of energy absorbed;
- wherein said energy absorption device includes an anvil defining said deformation channel; and
- wherein said anvil includes a first lobe and a second lobe and a depression disposed between said first lobe and said second lobe.

17. A collapsible steering column assembly for a vehicle, said assembly comprising:
- a column jacket moveable along a longitudinal axis in response to a collision event;
- a release module releasably coupled to said column jacket for coupling said column jacket to the vehicle prior to the collision event and releasing said column jacket from the vehicle in response to movement of said column jacket along said longitudinal axis;
- an energy absorption device coupled to said release module and defining a deformation channel and including a strap disposed within said deformation channel with said strap moveable through said deformation channel along a deformation path in response to movement of said column jacket along said longitudinal axis;
- an axially extending pin moveable in an axial direction from a first axial position axially displaced outside of said deformation channel to a second axial position where said pin is disposed in said deformation channel such that said pin contacts said strap to alter said deformation path of said strap through said deformation channel for increasing a resistance force resisting movement of said strap through said deformation channel to increase an amount of energy absorbed; and
- an actuator for selectively moving said pin in the axial direction;
- wherein said energy absorption device includes an anvil defining said deformation channel; and
- wherein said anvil includes a first lobe and a second lobe and a depression disposed between said first lobe and said second lobe.

* * * * *